United States Patent [19]

Takami et al.

[11] Patent Number: 5,795,678
[45] Date of Patent: Aug. 18, 1998

[54] NEGATIVE ELECTRODE FOR USE IN LITHIUM SECONDARY BATTERY AND PROCESS FOR PRODUCING THE SAME

[75] Inventors: Norio Takami; Takahisa Ohsaki, both of Yokohama; Toshio Tamaki, Kamisu-machi; Hideyuki Nakajima, Kamisu-machi; Yasushi Katsuta, Kamisu-machi, all of Japan

[73] Assignees: Kabushiki Kaisha Toshiba; Petoca, Ltd., both of Tokyo, Japan

[21] Appl. No.: 414,195

[22] Filed: Mar. 31, 1995

[30] Foreign Application Priority Data

Apr. 1, 1994 [JP] Japan ................... 6-085246

[51] Int. Cl.$^6$ ........................ H01M 4/58; H01M 4/02
[52] U.S. Cl. ................................. 429/218; 429/209
[58] Field of Search ........................ 429/209, 218

[56] References Cited

U.S. PATENT DOCUMENTS

| | | | |
|---|---|---|---|
| 4,980,250 | 12/1990 | Takahashi et al. | 429/194 |
| 5,153,082 | 10/1992 | Ogino et al. | 429/218 |
| 5,244,757 | 9/1993 | Takami | 429/218 |
| 5,312,611 | 5/1994 | Takami et al. | 423/447.6 |
| 5,340,670 | 8/1994 | Takami et al. | 429/194 |
| 5,436,092 | 7/1995 | Ohtsuka et al. | 429/194 |
| 5,482,797 | 1/1996 | Yamada et al. | 429/218 |

FOREIGN PATENT DOCUMENTS

| | | |
|---|---|---|
| 0 495 613 | 7/1992 | European Pat. Off. |
| 0 644 603 | 3/1995 | European Pat. Off. |
| 4-61747 | 2/1992 | Japan |
| 5-325967 | 12/1993 | Japan |
| 6-168725 | 6/1994 | Japan |

OTHER PUBLICATIONS

Journal of the Electrochemical Society, vol. 140, No. 2, pp. 315–320, Feb., 1993, N. Imanishi, et al., "Charge–Discharge Characteristics of Mesophase-Pitch-Based Carbon Fibers for Lithium Cells".

Patent Abstracts of Japan, vol. 18, No. 12(C–1150), Jan. 11, 1994, JP–5–247729, Sep. 24, 1993.

Proceedings of the Symposium on High Power, Ambient Temperature Lithium Batteries, vol. 92, No. 15, Oct. 13, 1991, pp. 80–89, N. Imanishi, et al., "The Structure and Charge–Discharge Characteristics of Mesophase-Pitch Based Carbons".

Primary Examiner—Kathryn L. Gorgos
Assistant Examiner—Edna Wong
Attorney, Agent, or Firm—Oblon, Spivak, McClelland, Maier & Neustadt, P.C.

[57] ABSTRACT

A negative electrode for use in a secondary battery which comprises milled graphite fibers derived from mesophase pitch each having circumferential, upper end and lower end faces, the milled graphite fibers each being composed of graphite layers having therebetween voids as inlets and outlets for lithium ions, all of the circumferential, upper end and lower end faces having openings of the voids between the graphite layers, which serve as inlets or outlets for lithium ions. This negative electrode for use in a secondary battery can be utilized to provide a lithium secondary battery of nonaqueous electrolyte which has large charge and discharge capacities and which permits setting the current density at charge or discharge high.

6 Claims, 3 Drawing Sheets

NEGATIVE ELECTRODE FOR USE IN LITHIUM SECONDARY BATTERY AND PROCESS FOR PRODUCING THE SAME

DETAILED DESCRIPTION OF THE INVENTION

1. Field of Industrial Application

The present invention relates to a negative electrode for use in a lithium secondary battery and a process for producing the same. More particularly, the present invention is concerned with a negative electrode for use in a secondary battery which comprises specified milled graphite fibers and which provides a lithium secondary battery of nonaqueous electrolyte having large charge and discharge capacities per weight and permitting to set the current density at the charge or discharge high, and is further concerned with a process for producing the same.

2. Prior Art

The secondary battery in which an alkali metal such as lithium is used as an active material of a negative electrode has generally various advantages. For example, it not only ensures high energy density and high electromotive force, but also has wide operating temperature range due to the use of a nonaqueous electrolyte. Further, the secondary battery is excellent in shelf life, miniaturized and lightweight.

Therefore, the practical use of the above nonaqueous-electrolyte-loaded lithium secondary battery is anticipated as a power source for use in a portable electronic appliance and also as a high-performance battery for use in an electric vehicle and electricity storage.

However, all the developed prototype batteries have not fully realized the above properties anticipated from the lithium secondary battery, and thus have been incomplete from the viewpoint of charge and discharge capacities, cycle life and energy density.

A major cause thereof resided in a negative electrode used in the secondary battery.

For example, a lithium secondary battery having a negative electrode composed of metal lithium incorporated therein had disadvantageously short cycle life and poor safety because lithium precipitated on the surface of the negative electrode during charging to form acicular dendrite which causes short-circuit to be likely to occur between the negative and positive electrodes.

Lithium has extremely high reactivity, thereby causing the electrolyte to suffer from decomposition reaction in the vicinity of the surface of the negative electrode. Thus, there was the danger that the above decomposition reaction would modify the surface of the negative electrode to thereby lower the cell capacity during repeated uses of the secondary battery.

Various studies have been made on the material of the negative electrode with a view toward obviating the above problems of the lithium secondary battery.

For example, the use of alloys containing lithium, such as lithium/aluminum and Wood's alloy, as the material of the negative electrode of the lithium secondary battery, has been studied. However, this negative electrode composed of such a lithic alloy had a problem of crystal structure change attributed to the difference in operating temperature and charge and discharge conditions.

Further, the use of carbon or graphite materials as the material of the negative electrode of the lithium secondary battery, has been studied. For example, an attempt has been made to capture lithium ions formed during charging into spaces existing between graphite layers of a carbon or graphite material (intercalation) to thereby produce a compound known as "intercalation compound" for the purpose of preventing the formation of dendrite.

Carbon fibers derived from coal, coke and PAN and carbon fibers derived from isotropic pitch have been extensively studied as the above carbon materials.

However, these carbon materials have several drawbacks, for example, in that not only are graphite crystallites small but also the crystals are disorderly arranged, so that the charge and discharge capacities thereof are unsatisfactory, and in that when the current density is set high at the time of charging or discharging, decomposition of the electrolyte occurs to thereby lower the cycle life.

Graphite materials such as natural and artificial graphites are now attracting intensive attention as the carbon material for forming a negative electrode for use in a lithium secondary battery and are being extensively studied.

Although the charge or discharge capacity per weight of the natural graphite is pretty large if the graphitization degree is high, the natural graphite has a drawback in that the current density ensuring reasonable discharge is low and in that the charging or discharging at a high current density would lower the charge or discharge efficiency. This natural graphite is not suitable for use in a negative electrode of a high-load power source from which a large amount of current must be discharged and into which it is desired to effect charging at a high current density in order to cut charging time, e.g., a power source for a device equipped with a drive motor or the like.

In the negative electrode composed of the conventional artificial graphite, the volume of inter-graphite-layer voids as a whole is so satisfactory that large charge and discharge capacities are obtained as long as the graphitization degree is high. However, the artificial graphite also was not suitable for charging or discharging at a high current density.

In the lithium secondary battery using a negative electrode composed of the conventional graphite material, the current density at the time of charging is generally in the range of 25 to 35 mA/g, and thus the charging takes about 10 hr in view of the charge capacity. If the charging can be performed at a higher current density, for example, 100 mA/g, however, the charging time can be as short as 3 hr. Further, if the current density is 600 mA/g, the charging time can be even as short as 30 min.

The inventors have made extensive and intensive studies with a view toward obviating the above drawbacks. As a result, they have found that the exposing area of the inter-graphite-layer voids as inlets for lithium ions is so small in the negative electrode composed of the natural graphite that the negative electrode is not suitable for the charge or discharge at a high current density, thereby bringing about the above drawbacks. Moreover, the inventors have found that each of the graphite layers does not continue long but is cut to pieces inside the artificial graphite, so that the lithium ions cannot be rapidly diffused through the interlayer voids with the result that the charge or discharge cannot be effected at a higher current density.

The inventors have made further investigations of a carbon material with a graphite-layer structure capable of providing a negative electrode having large charge and discharge capacities and permitting charging and discharging at high current densities on the basis of the above finding of the relationship between the graphite layer structure and the battery properties. As a result, it has been found that milled graphite fibers derived from mesophase pitch each having a structure such that the graphite layers are oriented so as for the inter-graphite-layer voids as inlets and outlets for lithium ions to be present over the circumferential, upper end and lower end faces of the fibers, further having a structure such that most of the inter-graphite-layer voids of the milled graphite fibers communicate with the surface thereof, impart markedly excellent battery characteristics to the negative electrode for use in a lithium secondary battery. The present invention has been completed on the basis of the above findings.

OBJECT OF THE INVENTION

The present invention has been made to resolve the above problems of the prior art. Thus, an object of the present invention is to provide a negative electrode for use in a lithium secondary battery, capable of providing a lithium secondary battery of nonaqueous electrolyte which has large charge and discharge capacities and permits to set the current density at the time of charging or discharging high. Another object of the present invention is to provide a process for producing the above negative electrode for use in a lithium secondary battery.

SUMMARY OF THE INVENTION

The negative electrode for use in a lithium secondary battery according to one aspect of the present invention comprises milled graphite fibers derived from mesophase pitch each having circumferential, upper end and lower end faces, the milled graphite fibers each being composed of graphite layers having voids therebetween, all of the circumferential, upper end and lower end faces have openings of said voids between the graphite layers, which serve as inlets and outlets for lithium ions.

In the negative electrode for use in a lithium secondary battery according to the present invention, it is preferred that the milled graphite fibers derived from mesophase pitch have an aspect ratio of 1 to 20.

In the present invention, it is preferred that the internal inter-graphite-layer voids of the milled graphite fiber derived from mesophase pitch mostly have the inlets and communicate with the surface of the milled graphite fiber, and that the amount of lithium ions which can be inserted between the graphite layers correspond to at least 75% of the theoretical capacity of the graphite.

In the present invention, further, it is preferred that the milled graphite fibers derived from mesophase pitch contained in the negative electrode for use in a lithium secondary battery have a charge or discharge capacity at the charge or discharge at a current density of 100 mA/g, which is at least 85% of that at the charge or discharge conducted at a current density of 35 mA/g. Still further, it is preferred that the milled graphite fibers derived from mesophase pitch contained in the negative electrode have a charge or discharge capacity at the charge or discharge conducted at a current density of 600 mA/g, which is at least 85% of that at the charge or discharge conducted at a current density of 35 mA/g. In the present specification, "g" in the unit "mA/g" of the current density expresses weight (gram) of the milled graphite fibers contained in the negative electrode.

The process for producing a negative electrode for use in a lithium secondary battery according to another aspect of the present invention comprises the steps of:

spinning a mesophase pitch at a viscosity of 5 to 50 poise into a mesophase pitch fiber, rendering the mesophase pitch fiber infusible by heating at temperatures of which maximum is 200° to 350° C. to thereby obtain an infusibilized pitch fiber;

milling the infusibilized pitch fiber as it is or after preliminary treatment at 300° to 800° C. under an inert gas atmosphere to thereby obtain milled infusibilized pitch fibers, graphitizing the milled infusibilized pitch fibers at 2500° C. or higher to thereby obtain milled graphite fibers derived from mesophase pitch, and blending the milled graphite fibers derived from mesophase pitch with a binder and molding the blend into a form of negative electrode.

EMBODIMENTS OF THE INVENTION

Figure 1A:
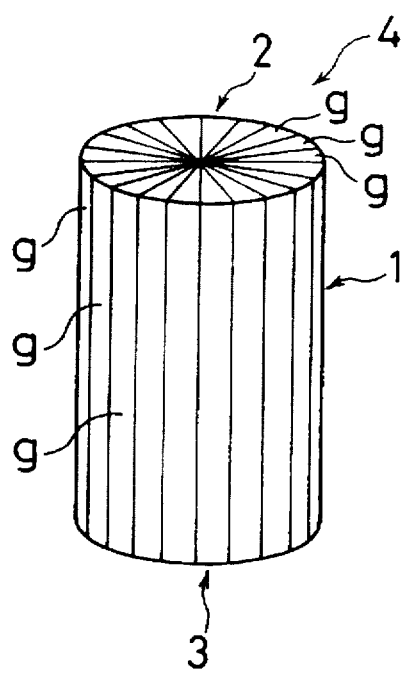
FIGS. 1A–1D are diagrammatic views of typical graphite layer structures of the milled graphite fibers derived from mesophase pitch for use in the present invention.

The negative electrode for use in a secondary battery according to the present invention will now be illustrated in greater detail.

The negative electrode for use in a secondary battery according to the present invention comprises milled graphite fibers derived from mesophase pitch.

The starting material of the graphite fibers for use in the present invention is an optically anisotropic pitch, i.e., mesophase pitch. The mesophase pitch can generally be prepared from petroleum, coke and other various raw materials. The starting material of the graphite fiber for use in the present invention is not particularly limited as long as it is spinnable.

The desired mesophase-base graphite fiber produced by subjecting the above starting pitch to spinning, infusibilization and carbonization or graphitization permits free control of the crystallization degree thereof, so that it is suitable for use in the preparation of a negative electrode of a secondary battery.

Among the graphite fibers, the terminology "milled graphite fiber" used herein means a graphite fiber having a length of not greater than 1 mm, as different from a chopped strand carbon fiber having a length of, for example, 1 to 25 mm. The milled graphite fibers can readily be formed into any desired negative electrode shape by adding a binder to the produced milled graphite fibers and molding the mixture into the desired negative electrode shape.

In the present invention, the milled graphite fiber derived from mesophase pitch contained in the negative electrode has inter-graphite-layer voids as inlets and outlets for lithium ions exposed over the circumferential, upper end and lower end faces thereof.

That is, in the milled graphite fiber, the graphite layers are piled one upon another so that all of the entire surfaces of the milled graphite fiber have the openings of the inter-graphite layer voids serving as inlets (outlets) for introducing (releasing) lithium ions into (from) the internal inter-graphite-layer voids. In the negative electrode composed of the milled graphite fibers each having the above graphite layer structure, the intercalation of lithium ions into the inter-graphite-layer voids is simultaneously carried out through the lithium ion inlet openings spread all over the surface of the fiber, so that the charge and discharge can be performed at high current densities to thereby permit charging within a short period of time and discharging at a high current density.

In the milled graphite fiber, it is preferred that the internal inter-graphite-layer voids mostly communicate with the surface of the milled graphite fiber.

In the milled graphite fiber of the above structure, most of the inter-graphite-layer voids present inside of the fiber have lithium ion inlets which open on the surface of the fiber, so that a negative electrode having large charge and discharge capacities can be obtained. In the present invention, it is preferred that the ratio of inter-graphite-layer voids communicating with the surface of the fiber in terms of the amount of lithium ions which can be inserted between the graphite layers correspond to at least 75%, especially at least 80%, of the theoretical capacity of the graphite.

The terminology "theoretical capacity of graphite" used herein means the electric capacity of graphite being in the state of $C_6Li$ in which Li is intercalated and stabilized at the normal temperature and pressure under the assumption that the voids of lattice planes $|d_{(002)}|$ being a parameter for crystallite in X-ray diffractometry is 0.3354 nm, and that each of the crystallite size along the c-axis $|Lc_{(002)}|$ and the crystallite size along the a-axis $|La_{(002)}|$ is infinitely large. The above electric capacity is 372 mAh/g.

The terminology "the amount of lithium ions which can be inserted" used herein means the maximum of the electric capacity which can be inserted between the graphite layers when the charging is conducted at a given charging current density. In conducting the insertion, any occurrence of precipitation of metallic lithium on the surface of the graphite material is judged as indicating that the insertion is no longer feasible.

The above described graphite layer structure of the milled graphite fiber will further be illustrated referring to FIGS. 1A–1D. FIGS. 1A–1D shows diagrammatic views of preferred forms of the graphite layer structure of the milled graphite fiber for use in the present invention.

In the graphite layer structure illustrated in FIG. 1A, each graphite layer g extends in a cylindrical milled graphite fiber 4 having a circumferential face 1 and two end faces 2, 3 along the longitudinal direction thereof in such a fashion that the layer expansion is made linearly and radially about the axis of the fiber 4. In this layer structure, each of the circumferential face 1 and two end faces 2, 3 crosses the graphite layer g at right angles, so that the voids present between neighboring graphite layers g have openings over the circumferential face 1 and two end faces 2, 3 of the fiber 4.

Figure 1B:
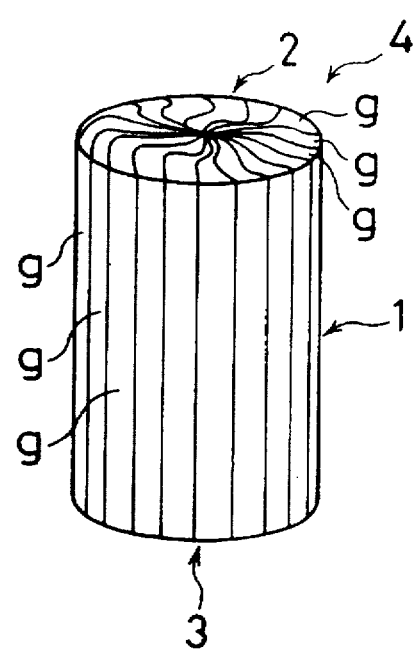

In the graphite layer structure illustrated in FIG. 1B, each graphite layer g extends in a cylindrical milled graphite fiber 4 having a circumferential face 1 and two end faces 2, 3 along the longitudinal direction thereof in such a fashion that the layer expansion is made radially while slightly being folded about the axis of the fiber 4.

Figure 1C:
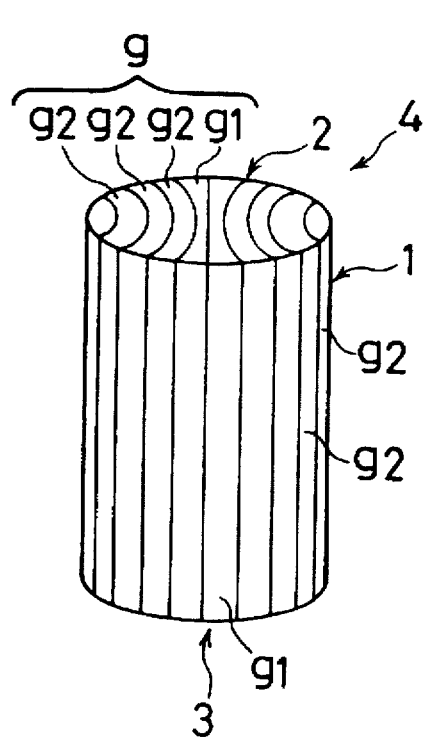

In the graphite layer structure illustrated in FIG. 1C, the graphite layers g consist of a pair of central graphite layers g1 facing each other across an interface which passes central diameters of the end faces 2, 3 of a cylindrical milled graphite fiber 4 and which extends along the longitudinal direction of the fiber 4 and two-side graphite layers g2 successively piled on each of the central graphite layers g1 which are curved so as to be protrudent and bulging toward the central layers g1.

Figure 1D:
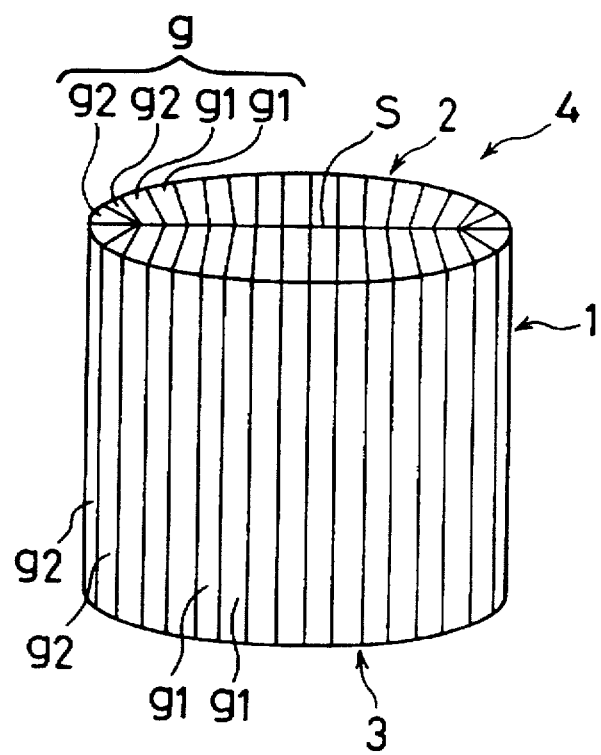

The graphite layer structure illustrated in FIG. 1D has a layer rupture face s which passes central diameters of the two end faces 2, 3 of a tubular milled graphite fiber 4 and extends along the longitudinal direction thereof. In this structure, the graphite layers g consist of parallel graphite layers g1 extending along the longitudinal direction of the graphite fiber 4 and disposed on both sides of the layer rupture face s in the central portion thereof so as for the parallel graphite layers g1 to be perpendicular to the layer rupture face s and sectorial graphite layers g2 sectorially piled at both edge portions of the layer rupture face s about the edge portions.

In the graphite layer structures of FIGS. 1B–1D as well, the graphite layers are piled in such a fashion that the graphite layers are cut at given angles by the circumferential, upper end and lower end faces of the milled graphite fiber as in FIG. 1A. As a result, the inter-graphite-layer voids open on not only the circumferential face but also both the end faces of the graphite fiber.

The graphite layer structure of the milled graphite fiber derived from mesophase pitch according to the present invention is only required to have inter-graphite-layer voids exposed as inlets and outlets for lithium ions over the circumferential, upper end and lower end faces. Thus, it should not be limited to the structures of FIGS. 1A–1B in interpreting the present invention.

The graphite layer structure of the milled graphite fiber as defined in the present invention may be confirmed by observing the sectional and side face structures with the use of scanning electron micrographs (SEM), which are suitable for confirming the outlines of the pile structure and arrangement of graphite layers in the milled graphite fiber.

Figure 2:
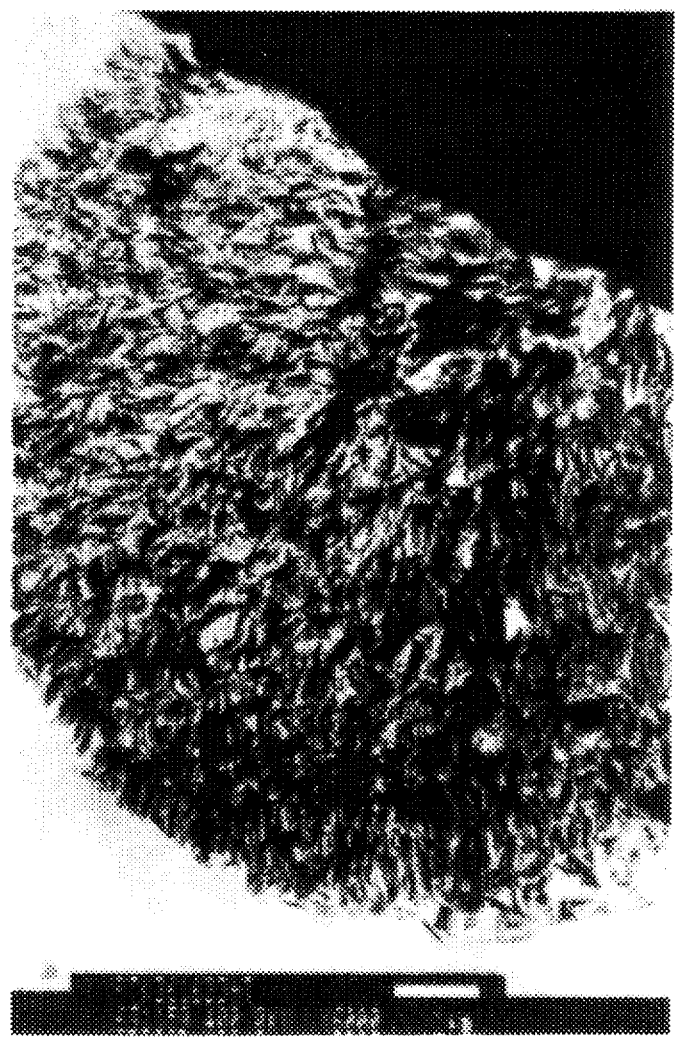
FIG. 2 is a transmission electron micrograph of a milled graphite fiber derived from mesophase pitch for use in the present invention.
Figure 3:
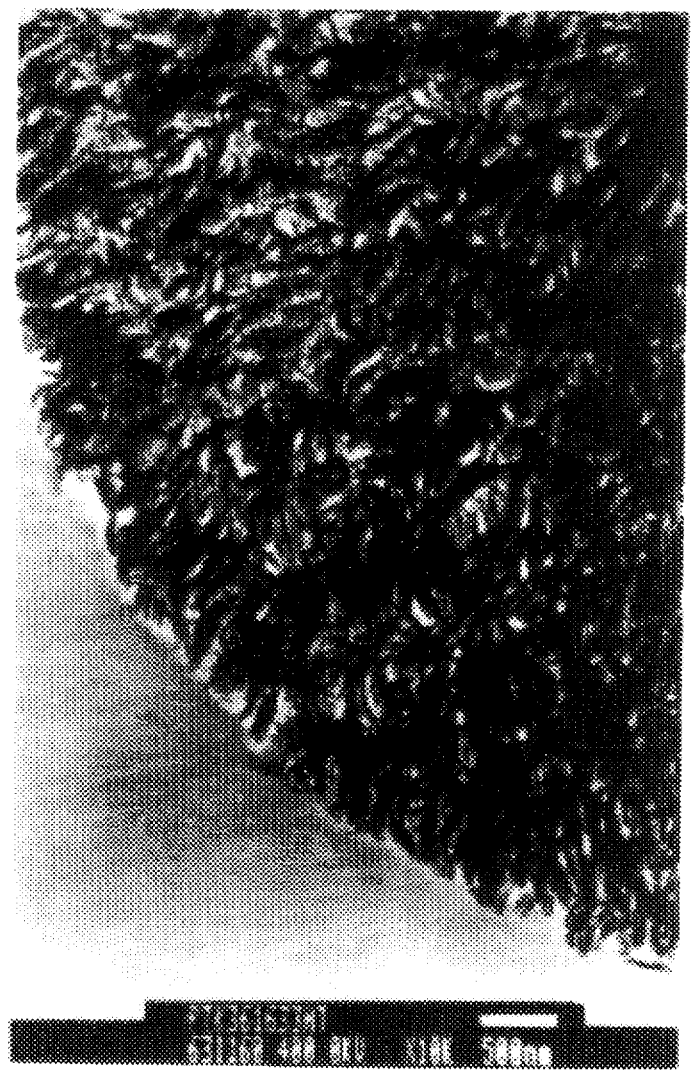
FIG. 3 is a transmission electron micrograph obtained by enlarging FIG. 2.

Further, the fine inner structure of the graphite layers of the milled graphite fiber may be confirmed by the use of transmission electron micrographs (TEM) of sections thereof. FIGS. 2 and 3 are TEMs of sections of the graphite fibers derived from mesophase pitch for use in the present invention, in which it is observed that the graphite layers are disposed radially from the center of the fiber toward the surface thereof and that practically all of the graphite layer interfaces (inter-graphite-layer voids) communicate with the circumferential face (open on the face).

The above described milled graphite fibers derived from mesophase pitch may be produced by spinning the above starting pitch, infusibilizing the spun fiber and performing milling, carbonization and graphitization of the infusibilized fiber in the below described sequence.

The starting pitch may be spun by any of the conventional melt, centrifugal, vortex, melt blow and other spinning techniques. Especially, the melt blow spinning technique is preferred, collectively taking into account the capacity for spinning processing, the cost for installing spinning apparatus and the degree of freedom in setting operating conditions.

The high-speed spinning of a starting pitch having a viscosity as low as several to several tens of poises which has been believed to be difficult with the use of the conventional spinning techniques can be attained by the melt blow spinning of the pitch fiber for use in the present invention. The arrangement of mesophase molecules can be controlled so as to be along the fiber axis direction and practically perpendicular to the surface by extruding the mesophase pitch of low viscosity through a nozzle with high speed and imparting shear force to the extruded pitch fiber while quenching.

This arrangement of mesophase molecules increases the inclination toward graphitization of the fundamentally readily graphitizable mesophase pitch in the pitch fiber obtained by the melt blow technique. Further, the resultant pitch fiber is capable of providing the milled graphite fiber as the final product with a structure in which the graphite layers are oriented so as to expose inter-graphite-layer voids practically throughout the surfaces of the fiber, especially a structure in which most of the volume of inter-graphite-layer voids communicate with the surface of the milled graphite fiber.

The graphite fiber obtained by the above spinning step from the starting pitch particularly has graphite layer structures as typically shown in FIGS. 1A–1B. The milled graphite fiber obtained from this graphite fiber has a structure such that the inter-graphite-layer voids open over the entire surface including the cut surfaces composing both end faces.

In the process for producing the milled graphite fiber for use in the present invention, it is preferred that a mesophase pitch be spun at a viscosity of 5 to 50 poise (measured by HAKKE Type M-500 VISCOMETOR), especially 5 to 20 poise, and at a temperature of 300° to 400° C., especially 320° to 380° C., to obtain a pitch fiber, the pitch fiber be rendered infusible at temperatures whose maximum is in the range of 200° to 350° C., especially 250° to 320° C., the infusibilized pitch be milled as it is or after preliminary heat treatment (light carbonization) in an inert gas at 300° to 800° C., especially 400° to 750° C. and still especially 500° to 700° C. to thereby obtain milled infusibilized pitch fibers, and the milled infusibilized pitch fibers be graphitized at 2500° C. or higher, especially 2800° to 3100° C.

In the method for preparing a lithium secondary battery of the present invention, the mesophase pitch is spun at a viscosity of 5 to 50 poise to obtain the mesophase pitch fibers. When the viscosity of the mesophase pitch subjected to the spinning is less than 5 poise, the mesophase pitch is apt to spun as fibers having a small fiber diameter, and it is impossible to control the spinning process so that the resulting pitch fibers have a desirable diameter. In results, the resulting pitch fibers become too small in a fiber diameter. Further, the resulting pitch fibers come to have widely varied diameters and are frequently cut during the spinning process to cause shots. When such pitch fibers are infusibilized and milled, the particle size of the milled fibers becomes unstable, the aspect ratio thereof becomes more than 20, and long fibers having a length of more than 200 μm are increased. Further, the shots produced in the spinning process cause production of undesirable micro-powders during the milling of the mesophase pitch fibers.

When the viscosity of the mesophase pitch subjected to the spinning is more than 50 poise, spinnability of the pitch is decreased, and it is impossible to control the spinning process so that the resulting pitch fibers have a desirable diameter. In results, the resultant pitch fibers become too large in a diameter. Further, the decrease of spinnability causes the frequent cut of the pitch fibers during the spinning process by slight change of the spinning conditions. When such pitch fibers having a large fiber diameter are infusibilized and milled, there occur cracks on the milled infusibilized fibers along with the fiber axis, which will be along the graphite layer plane grown in the graphitizing process. Such cracks of the milled pitch fibers make the milled graphite fibers obtained by graphitizing the pitch fibers have a possibility of decomposing the electrolyte to cause gas generation, according to the selected graphite conditions.

Further, by milling the infusibilized pitch fiber as it is or after preliminary heat treatment at 300° to 800° C. and subjecting the milled fibers to secondary heat treatment at 2500° C. or higher, longitudinal cracks of the milled fibers can be prevented and functional groups decomposing the electrolyte can be removed from the surface of the milled graphite fiber after secondary heat treatment.

The milling may be effected after the heat treatment (graphitization) at 2500° C. or higher. This is, however, likely to cause cracks to occur along the graphite layer plane having grown along the fiber axis and to increase the proportion of the crack surface area to the total surface area of the produced milled graphite fiber. The crack surface is unfavorable because practically it does not contribute to the intercalation of lithium ions. Further, functional groups decomposing the electrolyte are formed on the newly produced crack surface, thereby gravely deteriorating the battery properties. Therefore, the milling after graphitization is not favorable.

In the milling step conducted after the infusibilization or preliminary heat treatment of the pitch fiber, it is preferred from the viewpoint of efficiently obtaining the fibers suitable for use in the present invention that the milling be performed by a procedure comprising revolving a rotor equipped with a blade at a high speed and contacting the fiber with the blade to thereby cut the fiber in the direction perpendicular to the fiber axis. In this procedure, the milling may be performed by the use of, for example, the Victory mill or cross flow mill. In the above procedure, the length of each of the milled carbon fibers can be controlled by regulating the rotating speed of the rotor, the angle of the blade, the size of porosity of a filter attached to the periphery of the rotor, etc.

In the art, the milling of the carbon fiber has also been performed by means of the Henschel mixer, ball mill or crusher. These millings cannot be stated to be an appropriate procedure because not only does pressure apply to the carbon fiber in the direction of the diameter thereof to thereby increase the probability of longitudinal cracks along the fiber axis but also the milling takes a prolonged period of time.

Of the milled graphite fibers obtained by graphitizing the above produced milled fibers, it is preferred in the present invention to employ those having an aspect ratio ranging from 1 to 20, especially from 1 to 10 and a fiber diameter variation coefficient ranging from 10 to 50%, especially from 15 to 40%. The milled graphite fibers have preferably an average diameter ranging from 5 μm to 20 μm, particularly from 5 μm to 15 μm. The employment of the above milled graphite fibers leads to the realization of a higher bulk density of the resultant negative electrode for use in a secondary battery.

Herein, each of the above aspect ratio and fiber diameter variation coefficient is an average of the values of at least 100 samples taken from the obtained milled graphite fibers.

That is, when the aspect ratio exceeds 20 or when the fiber diameter variation coefficient is less than 10%, an interstice is unfavorably formed between fibers to thereby render the increase of the bulk density of the negative electrode unattainable and further to cause the conductivity thereof to be poor.

Moreover, when the aspect ratio of the employed milled graphite fibers exceeds 20 and becomes too large, that is, when the employed milled graphite fibers each have an extremely large fiber length, short circuiting is unfavorably likely to occur between the negative and positive electrodes besides the difficulty in increasing the bulk density of the negative electrode.

The employment of milled graphite fibers having a fiber diameter variation coefficient exceeding 50% involves the mixing of graphite fibers having too large fiber diameters, so that, unfavorably, the flatness of the electrode surface is decreased, or the pressure applied during roll shaping is focused on the above too large graphite fibers to thereby bring about the danger of longitudinal fiber cracks.

When the aspect ratio is less than 1, the number of graphite fibers suffering from longitudinal cracks along the fiber axis is unfavorably increased during milling.

In the production of a mass of milled graphite fibers having a fiber diameter variation coefficient of 10 to 50%, it is advantageous to spin pitch into pitch fibers through a spinning nozzle having a plurality of spinning orifices with different diameters per nozzle.

Alternatively, it is feasible to in advance produce a plurality of pitch fibers with different diameters and then performing either appropriate blending followed by milling or milling followed by blending.

It is preferred that the milled graphite fibers for use in the present invention have an average particle size (D) of 10 to 30 µm, especially 10 to 20 µm, as measured by laser-diffraction-type particle size distribution meter (SALD-3000 produced by Shimadzu Corporation), and that 90% D be in the range of 30 to 60 µm, because the bulk density of the negative electrode can be high and because the cell capacity per volume can be increased.

Further, it is preferred that the maximum length of the milled graphite fibers be 120 µm or less, especially 100 µm or less, still especially 80 µm or less, from the viewpoint of preventing inter-electrode short circuit.

Still further, it is preferred that the specific surface area of the milled graphite fibers be in the range of 0.5 to 2.0 m$^2$/g as measured by QUANTASOAB® specific surface area meter manufactured by QUANTA CHROME Corporation. Milled graphite fibers having a specific surface area exceeding 2.0 m$^2$/g unfavorably increase the decomposition of electrolyte at the time of charge or discharge, thereby lowering the charge and discharge efficiency and causing gas generation attributed to electrolytic decomposition.

The graphite layer structure and morphology of the milled graphite fiber for use in the present invention and the process for producing the same have been described. Now, the purity and crystal structure of the milled graphite fiber will be described.

The carbon material generally contains compounds of elements other than carbon, such as nitrogen, oxygen, sulfur, halogens and metals, e.g., iron, depending on the type of the starting material. The purity of the carbon material for use in the negative electrode affects the ratio of discharge capacity to charge capacity (hereinafter referred to as "charge and discharge efficiency") of a secondary battery, especially the initial charge and discharge efficiency.

The total content of such impurities in the milled graphite fiber for use in the present invention is preferably not greater than 2000 ppm, still preferably not greater than 1000 ppm. The above total content of impurities may be determined by the flame photometry, plasma fluorescence analysis, ion chromatography or the like.

Lithium is likely to react with any of compounds of the above elements other than carbon, thereby forming lithium compounds. Once the lithium compounds are formed, lithium cannot be present in the form of free lithium ions. That is, when a carbon material containing the above impurities in a concentration exceeding 2000 ppm is employed as the material of a negative electrode, the negative electrode may have an extremely low charge and discharge efficiency, especially an extremely low initial charge and discharge efficiency.

A treatment comprising reacting chlorine, etc. with the impurities during carbonization or graphitization and removing the impurities as halides from the system, i.e., a highly purifying treatment, is advantageously carried out for obtaining a purified carbon material whose impurity content is not greater than 2000 ppm.

In the production of the mesophase-base graphite fiber, it is preferred that a starting pitch material having the lowest possible impurity content be chosen, and that filtration and other treatments be performed to further reduce the impurity content.

With respect to the crystallite parameters in X-ray diffractometry of the milled graphite fiber particularly suitable for use in a negative electrode according to the present invention, it is preferred that the inter layer distance ($d_{002}$) be 0.336 to 0.342 nm, especially 0.336 to 0.338 nm, that the size of crystallite along the c-axis ($Lc_{(002)}$) be 17 to 80 nm, especially 30 to 60 nm, and that the size of crystallite along the a-axis ($La(110)$) be 8 to 100 nm, especially 20 to 80 nm.

The X-ray diffractometry employed herein is a method in which a diffraction pattern of a carbon material is obtained with the use of Cukα and a highly purified silicon as the X-ray source and reference material, respectively. The inter layer distance ($d_{002}$) and size of crystallite along the c-axis ($Lc_{(002)}$) have respectively been calculated from the peak position and half-value width of the 002 diffraction pattern, and the size of crystallite along the a-axis ($La_{(110)}$) from the peak position and half-value width of the 110 diffraction pattern, in accordance with the method of the Japan Society for Promotion of Scientific Research.

The negative electrode for use in a secondary battery according to the present invention may be produced by graphitizing the thus obtained milled fibers at 2500° C. or higher to thereby obtain milled graphite fibers derived from mesophase pitch and by blending the milled graphite fibers derived from mesophase pitch with a binder, followed by forming the binder-loaded graphite fibers by means of rolls into a shape suitable for use as a negative electrode. If desired, this negative electrode undergoes reduction treatment which is conducted with the use of metallic lithium as the counter electrode.

Examples of the above binders for use in the negative electrode for a secondary battery include polyethylene, polyvinylidene fluoride and polytetrafluoroethylene.

The thus produced negative electrode for use in a secondary battery according to the present invention has a bulk density of generally at least 1.3 g/cm$^3$, preferably at least 1.4 g/cm$^3$ and still preferably at least 1.5 g/cm$^3$, so that it is suitable for miniaturization of a battery.

In the present invention, further, it is preferred that the negative electrode for use in a lithium secondary battery have a charge or discharge capacity at the charge or discharge conducted at a current density of 100 mA/g, which is at least 85%, preferably at least 90%, of that at the charge or discharge conducted at a current density of 35 mA/g. Still further, it is preferred that the negative electrode for use in a lithium secondary battery have a charge or discharge capacity at the charge or discharge conducted at a current density of 600 mA/g, which is at least 85% of that at the charge or discharge conducted at a current density of 35 mA/g.

The negative electrode for use in a secondary battery according to the present invention may be provided with a current collector as is the conventional battery electrode. The current collector for the negative electrode may be in the form of a plate, a foil or a rod composed of a conductor electrochemically inert to the electrode and the electrolyte, e.g., selected from metals such as copper, nickel, titanium and stainless steel. The above current collector may be applied to the positive electrode described later.

A lithium-ion secondary battery including the negative electrode for use in a secondary battery according to the present invention may be comprised of the negative electrode of the present invention, a positive electrode and, interposed therebetween, a separator impregnated with an electrolyte.

The separator may be comprised of a nonwoven or woven fabric of synthetic or glass fibers, a polyolefinic porous membrane, a nonwoven fabric of polytetrafluoroethylene, polyethylene and other conventional material.

Although the type of the solvent for use in the electrolyte infiltrated in the separator is not particularly limited as long as it can dissolve lithium salts, it is preferred that the solvent be selected from aprotic organic solvents having high dielectric constants.

Examples of such solvents include propylene carbonate, ethylene carbonate, tetrahydrofuran, 2-methyltetrahydrofuran, dioxolane, 4-methyldioxolane, acetonitrile, dimethyl carbonate, diethyl carbonate, γ-butyrolacton and methyl ethyl carbonate. These solvents may be used either individually or in appropriate combination.

For example, lithium salts capable of forming stable anions may be suitably used as the electrolyte, which include, for example, lithium perchlorate, lithium borofluoride, lithium hexafluoroantimonate, lithium hexachloroantimonate and lithium hexafluorophosphate ($LiPF_6$).

Various materials may be used for composing the positive electrode, which include, for example, metal oxides such as chromium oxide, titanium oxide and vanadium pentoxide; lithium metal oxides such as lithium manganese pentoxide; lithium metal oxides such as lithium manganese oxide ($LiMn_2O_4$), lithium cobalt oxide ($LiCoO_2$) and lithium nickel oxide ($LiNiO_2$); transition metal chalcogen compounds such as titanium and molybdenum sulfides; and conductive conjugated polymeric substances such as polyacetylene, polyparaphenylene and polypyrrole.

The negative electrode for use in a secondary battery according to the present invention is accommodated together with other battery constituting elements, such as the above-mentioned current collector, positive electrode and separator, and the electrolyte into a casing by the use of a gasket, a sealing plate, etc. according to the customary procedure. Thus, a cylindrical, rectangular or buttony lithium-ion secondary battery can be assembled.

EFFECT OF THE INVENTION

The negative electrode for use in a lithium secondary battery according to the present invention comprises milled graphite fibers derived from mesophase pitch each having circumferential, upper end and lower end faces, said milled graphite fibers each being composed of graphite layers having voids therebetween, all of said circumferential, upper end and lower end faces having openings of said voids between the graphite layers, which serve as inlets and outlets for lithium ions. Thus, the negative electrode has large charge and discharge capacities. Therefore, the present invention provides a negative electrode for use in a lithium secondary battery, which can provide a nonaqueous-electrolyte-base lithium secondary battery permitting to set the current density high at the time of charging or discharging.

The negative electrode for use in a lithium secondary battery which has the above characteristics can efficiently be produced by the process for producing a negative electrode for use in a lithium secondary battery according to the present invention.

EXAMPLES

The present invention will be illustrated in greater detail below with reference to the following Examples, which should not be construed as limiting the scope of the invention. The properties of the milled graphite fibers produced in the Examples and Comparative Examples and the charge and discharge characteristics of the resultant secondary batteries are collectively shown in Tables 1 and 2.

Example 1

A starting material of optically anisotropic mesophase pitch having a softening point of 280° C. was melted and drawn through a nozzle comprising a 3 mm wide slit and, arranged therein, a line of 1500 spinning orifices each having a diameter of 0.2 mm while injecting hot air through the slit, thereby obtaining pitch fibers. The spinning was conducted under the conditions of a pitch injection rate of 1500 g/min, a pitch viscosity of 30 poise, a pitch temperature of 340° C., a hot air temperature of 350° C. and a hot air pressure of 0.2 kg/cm²G. The pitch fibers having exited the nozzle were quenched to a temperature close to room temperature already at a distance of several tens of centimeters from the nozzle by a large excess of associated room temperature air.

The spun pitch fibers were collected in the form of a mat on a belt having a collection zone of 20-mesh stainless steel net while sucking the fiber carrying air from the back of the belt.

The resultant collected fiber mat was heated in the air for 20 min at 300° C. to which the temperature was elevated from room temperature at an average increase rate of 6° C./min to thereby render the fiber mat infusible.

Further, the infusibilized mat was heated to 700° C. under an atmosphere of inert gas in a preliminary heat treatment furnace disposed on the same process line.

The thus obtained infusibilized mesophase-pitch-derived fibers were milled with the use of a cross flow mill to obtain fibers having an average particle size of 20 μm, which were then graphitized at 2800° C. in argon. The resultant milled graphite fibers had a specific surface area of 1.1 m²/g and an aspect ratio of 4.

The milled graphite fibers had an inter layer distance ($d_{002}$), a size of crystallite along the c-axis ($Lc_{(002)}$) and a size of crystallite along the a-axis ($La_{(110)}$) of 0.3375 nm, 33 nm and 55.2 nm, respectively, in the analysis thereof by X-ray diffractometry.

An SEM observation of the milled graphite fibers showed that each of the fibers had a cylindrical shape whose section exhibited graphite layers expanding radially while slightly being folded, as illustrated in FIG. 1(b), and most of the graphite layers having openings on the surface of the fiber. Further, the sides of the milled graphite fibers exhibited the structure in which the graphite layers were arranged regularly in parallel along the fiber axis and in which the inter-graphite-layer portions exposed themselves over the side surfaces. 20 mg of the milled graphite fibers were blended with 3% by weight of a binder of polytetrafluoroethylene powder, sheeted, and assembled with a lead wire into a negative electrode. A charge at a current density of 35 mA/g with the use of the above negative electrode permitted charging of 348 mAh/g which corresponds to 94% of the theoretical charge capacity effected by an ideal lithium intercalation into graphite, i.e., 372 mAh/g.

Likewise, a discharge at a current density of 35 mA/g with the use of the above charged negative electrode gave a discharge capacity of 320 mAh/g corresponding to 86% of the theoretical discharge capacity.

Charge and discharge were repeated under the same conditions. Thus, a charge capacity of 313 mAh/g was confirmed at the 10th charge, and a discharge capacity of 313 mAh/g corresponding to 100% of the charge discharge efficiency at the 10th discharge.

Examples 2 to 5

The milled graphite fibers were produced in the same manner as in Example 1 and formed into negative electrodes in the same manner as in Example 1. Charge and discharge were conducted 10 times at different current densities, i.e., 100 mA/g in Example 2, 200 mA/g in Example 3, 300 mA/g in Example 4 and 600 mA/g in Example 5. The results are shown in Table 1.

All the charge and discharge capacities of Examples 2 to 5 were held at 90% or greater of those of Example 1 (current density of 35 mA/g).

Comparative Example 1

3% by weight of a binder of polytetrafluoroethylene powder was added to 20 mg of pulverized natural graphite (average particle size: 50 µm) which was commercially available for use in battery electrodes, mixed and sheeted. The same evaluation as in Example 2 was conducted. While the initial charge and discharge capacities were respectively 384 mAh/g (the reason for this exceeding the theoretical capacity is believed to be an addition made for the consumption attributed to, for example, the decomposition of the electrolyte) and 287 mAh/g. The 10th charge and discharge capacities were respectively 263 mAh/g and 252 mAh/g. Thus, capacity decreases were confirmed. Further, the 10th charge and discharge efficiency was 95.8% inferior to that exhibited when the negative electrode of Example 2 was employed.

Comparative Example 2

Charge and discharge were conducted at a current density of 600 mA/g with the use of the negative electrode of natural graphite produced in the same manner as in Comparative Example 1. As a result, metallic lithium precipitated on the surface of the negative electrode during the charging, repetitions of which led to formation of acicular dendrite. This is not preferable because of the occurrence of short circuit between the electrodes. Also, it is apparent that, from the viewpoint of performance as well, the natural graphite is not suitable for the charge and discharge at high current densities in that the power is consumed during charging by other than the lithium intercalation and in that the discharge efficiency is gravely low.

Comparative Example 3

With respect to the pulverized artificial graphite (average particle size: 10 µm) which was commercially available for use in battery electrodes, the same evaluation as in Comparative Example 1 was conducted. While the initial charge and discharge capacities were respectively 426 mAh/g and 288 mAh/g. The 10th charge and discharge capacities were respectively 238 mAh/g and 224 mAh/g. Thus, grave capacity decreases were confirmed as with the use of the natural graphite.

Comparative Example 4

Charge and discharge were repeated at a current density of 600 mA/g with the use of a negative electrode of artificial graphite produced in the same manner as in Comparative Example 3. As a result, metallic lithium precipitated on the surface of the negative electrode, bringing about grave performance degradation, as in Comparative Example 2.

TABLE 1

| | Graphitizing temperature (°C.) | Average particle size (µm) | Electrolyte-solvent | | Charge capacity (mAh/g) |
|---|---|---|---|---|---|
| Example 1 | 2800 | 20 | 1M-LiClO$_4$- EC/DMC | 1st 10th | 348 313 |
| Example 2 | 2800 | 20 | 1M-LiClO$_4$- EC/DMC | 1st 10th | 346 288 |
| Example 3 | 2800 | 20 | 1M-LiClO$_4$- EC/DMC | 1st 10th | 344 287 |
| Example 4 | 2800 | 20 | 1M-LiClO$_4$- EC/DMC | 1st 10th | 354 285 |
| Example 5 | 2800 | 20 | 1M-LiClO$_4$- EC/DMC | 1st 10th | 362 288 |
| Comp. Ex. 1 | natural graphite | 50 | 1M-LiClO$_4$- EC/DMC | 1st 10th | 384 263 |
| Comp. Ex. 2 | natural graphite | 50 | 1M-LiClO$_4$- EC/DMC | 1st 10th | 804 660 |
| Comp. Ex. 3 | artificial graphite | 10 | 1M-LiClO$_4$- EC/DMC | 1st 10th | 426 238 |
| Comp. Ex. 4 | artificial graphite | 10 | 1M-LiClO$_4$- EC/DMC | 1st 10th | 567 401 |

TABLE 2

| | Discharge capacity (mAh/g) | | Charge & discharge efficiency Discharge/charge (%) | | Current density (mA/g) | Remark |
|---|---|---|---|---|---|---|
| Example 1 | 1st 10th | 320 313 | 1st 10th | 92.0 100 | 35 | |
| Example 2 | 1st 10th | 304 288 | 1st 10th | 87.9 100 | 100 | |
| Example 3 | 1st 10th | 306 285 | 1st 10th | 89.0 99.3 | 200 | |
| Example 4 | 1st 10th | 309 287 | 1st 10th | 87.3 100 | 300 | |
| Example 5 | 1st 10th | 312 288 | 1st 10th | 86.2 100 | 600 | |
| Comp. Ex. 1 | 1st 10th | 287 252 | 1st 10th | 74.7 95.8 | 100 | |
| Comp. Ex. 2 | 1st 10th | 437 419 | 1st 10th | 54.4 63.5 | 600 | Metallic Li precipitated on negative electrode |
| Comp. Ex. 3 | 1st 10th | 288 224 | 1st 10th | 67.6 94.1 | 100 | |
| Comp. Ex. 4 | 1st 10th | 380 292 | 1st 10th | 67.0 72.8 | 600 | Metallic Li precipitated on negative electrode |

EC: ethylene carbonate
DMC: dimethyl carbonate

What is claimed is:

1. A negative electrode for use in a lithium secondary battery which comprises milled graphite fibers derived from mesophase pitch each having circumferential, upper end and lower end faces, said milled graphite fibers each being composed of graphite layers having voids therebetween, all of said circumferential, upper end and lower end faces having openings of said voids between the graphite layers, which serve as inlets and outlets for lithium ions, said milled graphite fibers having an interlayer distance ($D_{002}$) being from 0.336–0.338 nm, wherein said milled graphite fibers derived from a mesophase pitch are prepared by steps of:

spinning a mesophase pitch at a viscosity of 5 to 50 poise into a mesophase pitch fiber, infusibilizing the mesophase pitch fiber by heating at a temperature whose maximum is 200° to 350° C. to obtain an infusibilized pitch fiber, milling the infusibilized pitch fiber as it is or after preliminary heat treatment at 300° to 800° C. to obtain milled infusibilized pitch fibers; and graphitizing the milled infusibilized pitch fibers at 2500° C. or higher.

2. The negative electrode for use in a lithium secondary battery as claimed in claim 1, wherein the milled graphite fibers derived from mesophase pitch has an aspect ratio of 1 to 20.

3. The negative electrode for use in a lithium secondary battery as claimed in claim 1, wherein the milled graphite fibers derived from mesophase pitch has a specific surface area of 0.5 to 2.0 m²/g.

4. The negative electrode for use in a lithium secondary battery as claimed in claim 1, wherein the internal intergraphite layer voids of the milled graphite fibers derived from mesophase pitch communicate with the surface of the milled graphite fibers to such an extent that the amount of lithium ions which is inserted between the graphite layers corresponds to at least 75% of the theoretical capacity of the graphite.

5. The negative electrode for use in a lithium secondary battery as claimed in claim 1, wherein the negative electrode has a charge or discharge capacity at the charge or discharge conducted at a current density of 100 mA/g, which is at least 85% of that at the charge or discharge conducted at a current density of 35 mA/g.

6. The negative electrode for use in a lithium secondary battery as claimed in claim 1, wherein the negative electrode has a charge or discharge capacity at the charge or discharge conducted at a current density of 600 mA/g, which is at least 85% of that at the charge or discharge conducted at a current density of 35 mA/g.

* * * * *